United States Patent [19]

Kolchinsky

[11] Patent Number: 5,535,406

[45] Date of Patent: Jul. 9, 1996

[54] VIRTUAL PROCESSOR MODULE INCLUDING A RECONFIGURABLE PROGRAMMABLE MATRIX

[76] Inventor: Alexander Kolchinsky, 48 Gray Rd., Andover, Mass. 01810

[21] Appl. No.: 175,303

[22] Filed: Dec. 29, 1993

[51] Int. Cl.⁶ .................................................. G06F 15/00
[52] U.S. Cl. .................. 395/800; 364/228.6; 364/229.4; 364/231.9; 364/DIG. 1
[58] Field of Search ...................... 395/800; 364/228.6, 364/231.9, 229.4, DIG. 1

[56] References Cited

U.S. PATENT DOCUMENTS

| 5,109,503 | 4/1992 | Cruickshank et al. | 395/500 |
| 5,301,344 | 4/1994 | Kolchinsky | 395/800 |
| 5,361,373 | 11/1994 | Gilson | 395/800 |

OTHER PUBLICATIONS

Monaghan et al., "Reconfigurable Special Purpose Hardware For Scientific Computation And Simulation," Computing And Control Engineering Journal, Sep. 1992, pp. 225–234.

Sawyer et al., "Xilinx—The Third Generation," IEEE Colloquim On 'User–Configurable Logic–Technology And Applications,' Mar. 1991, pp. 1/1–7.

*Primary Examiner*—Alyssa H. Bowler
*Assistant Examiner*—John Harrity
*Attorney, Agent, or Firm*—George W. Neuner

[57] ABSTRACT

A virtual processor has a reconfigurable, programmable logic matrix array for processing data in accord with a hardware encoded algorithm, a memory for storing a plurality of hardware configuration files for the programmable logic matrix array, each configuration file for programming an algorithm to be executed by the matrix array, an input/output bus for supplying data to the matrix array for processing and for obtaining processed data from the matrix array, a memory device for storing data, a VPM controller for controlling the overall operation of the virtual processor including providing operation sequence maps, providing parameters for specific operations, and providing status information, a data bus controller for controlling the data flow to the matrix array for processing, and a configuration controller for controlling the sequence of reconfiguration of the matrix array to process data by a specific sequence of algorithms.

20 Claims, 15 Drawing Sheets

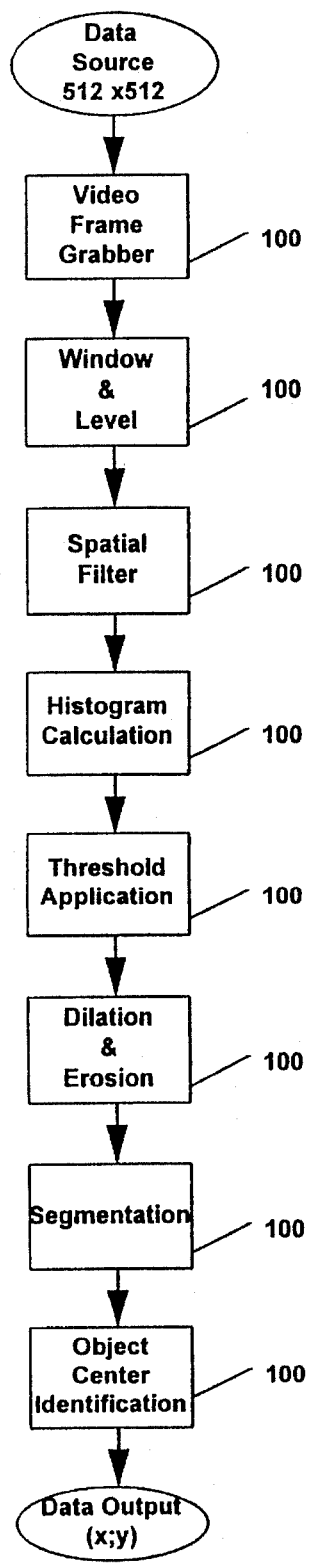
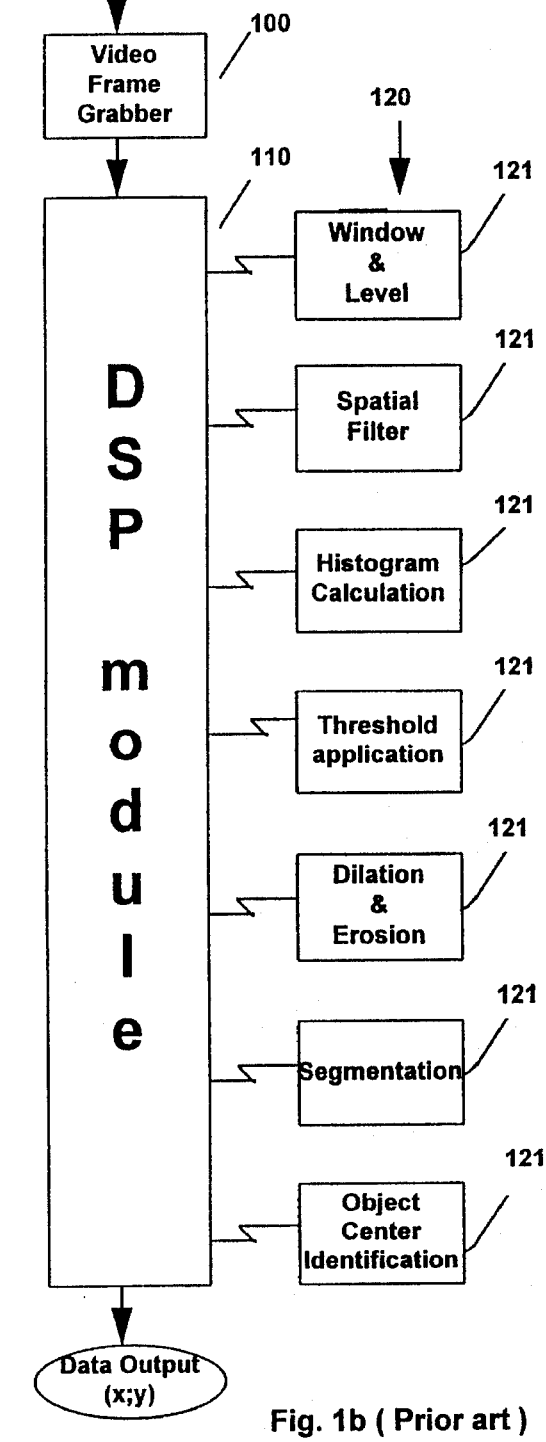
Fig. 1a ( Prior art )
Fig. 1b ( Prior art )

VIRTUAL PROCESSOR MODULE INCLUDING A RECONFIGURABLE PROGRAMMABLE MATRIX

FIELD OF THE INVENTION

This invention relates to a hardware processor module for information processing, and particularly to a virtual processor module having a reconfigurable programmable matrix, and more particularly to a virtual processor module having self-optimization capabilities for using its hardware processing resources for diverse computing operations.

BACKGROUND OF THE INVENTION

With the amount of information, and the complexity of its processing and transmission increasing every day, the need for flexible and, at the same time, cost effective hardware computer solutions is increasing.

Until recently, the computer solutions have been limited to a choice between software oriented general purpose computers (GPCs), such as personal computers and workstations, with or without acceleration boards, and hardware oriented application specific computers (APCs) built into a variety of specialized devices.

A GPC is generally designed with the primary goal of providing an acceptable performance in a wide variety of tasks rather than high performance in specific tasks. The performance of such computers depends upon how well the capabilities of the processing platform match the computational characteristics of the applications. Execution of a particular function in a GPC has to be programmed into a fixed set of instructions based on a fixed arithmetic logic unit (ALU) structure, for which the performance characteristics are further affected by the internal pipeline and the cache type and size associated with the processor. If an application requires more computational power than a GPC can achieve, users are forced to use an APC in which fundamental machine capabilities are designed for a particular class of algorithms. In an APC, functions are executed on hardware designed from standard parts, application specific integrated circuits (ASICs), and other readily available building blocks. Tasks suited to a given APC are performed exceptionally well, but tasks outside the targeted class are usually performed well below an acceptable level of performance, if at all.

However, with availability of the Field Programmable Gate Array (FPGA) from Xilinx Corporation, new possibilities have opened. The FPGA allows the logic circuits in a machine to be reconfigured to the job at hand and, thus, can offer a new mixture of performance and versatility. With the advent of FPGA-based custom computing machines, the potential exists for a user to design, exactly, a special processor for a particular application without having to build different processors for different applications. Machines based on FPGAs can execute with the inherent parallelism of hardware and, for the most part, the absence of much of the overhead of I/O, branch operations or instruction decoding of the GPC.

Currently, FPGAs are not useful alone for complex applications such as, for example, medical imaging. The use of FPGAs for such complex applications immediately requires consideration of data paths, pin limitations, interconnection with memory resources and partition of programs across the chips —in some cases, many chips. Thus, application solutions using FPGAs are presently quite expensive.

New architectural solutions are required to exploit the innate flexibility of the FPGA to make possible the execution of increasingly complex processing operations at lower costs.

SUMMARY OF THE INVENTION

The present invention provides a virtual processor module as a new architectural solution using a reconfigurable programmable logic device, such as the FPGA, for processing complex applications. The virtual processor module, in accord with the present invention, facilitates dividing complex operations into a series of simpler operations that are optimized in accord with a design strategy for performance and use of resources for execution by a reconfigurable programmable logic device that is dynamically modified by a processor through partial or complete reconstruction of its internal resources transparently to the operation of the rest of the system.

In accord with the present invention, a virtual processor comprises a programmable logic device capable of being configured to perform a plurality of different operations, means for providing a plurality of configuration files, each file for configuring the programmable logic device for performing a specific operation, and a controller for providing configuration files to the programmable logic device in an appropriate sequence for performing a complex operation.

A preferred virtual processor, in accord with the present invention, comprises the following components: a reconfigurable, programmable logic matrix array for processing data in accord with a hardware encoded algorithm; a memory for storing a plurality of hardware configuration files for the programmable logic matrix array, each configuration file for programming an algorithm to be executed by the matrix array; an input/output bus for supplying data to the matrix array for processing and for obtaining processed data from the matrix array; a memory device for storing data; a VPM controller for controlling the overall operation of the virtual processor including providing operation sequence maps, providing parameters for specific operations, and providing status information; a data bus controller for controlling the data flow to the matrix array for processing; and a configuration controller for controlling the sequence of reconfiguration of the matrix array to process data by a specific sequence of algorithms.

In accord with one embodiment of the present invention, a virtual processor module is provided whereby a complex operation can be divided into a series of simpler operations where each simple operation is executed by a particular configuration provided in the appropriate sequence to accomplish the complex operation through partial or complete dynamic reconstruction of the processor resources transparently to the operation of the rest of the system and to the user.

A virtual processor module in accord with the present invention can replace a number of modules, each efficiently designed for an execution of a particular function and connected with each other by a number of data busses for pipeline simultaneous processing, therefore, allowing significant savings in product cost, size and power consumption.

A virtual processor module in accord with the present invention can allow a user to modify and expand its functionality while achieving custom hardware performance level as provided by the reconfigurable programmable logic device such as a FPGA, but without any modifications to the processor hardware.

In one embodiment of the invention, upon a fault detection, the virtual processor module can reconfigure itself to provide full functionality at half the processing rate.

In another preferred embodiment of the invention, the virtual processor module uses a programmable real-time microcontroller to control programming, status verification and parameter interaction of a dynamically reconfigurable programmable logic device that is connected to input/output data busses and to internal data and parameter storage devices. The virtual processor module includes means for storing locally or accessing a library of configuration files necessary for programming the reconfiguration of the programmable logic device. Using the library of configuration files, a complex function request is performed by executing a number of simpler sub-functions, by queuing the configuration files into an appropriate sequence for their execution parameters and by controlling the programmable logic device through their executions. The real-time interaction of the programmable logic device and the controller, which provides parameter and status communications from configuration to configuration, creates a continuous processing of data to perform the required functionality for the complex operation. Preferably, means for fault detection of errors in a portion of the programmable logic device are provided and recovery of functionality is achieved through process reorganization using the remainder of the programmable logic device to provide full functionality at a reduced rate of operation.

In certain preferred embodiments of the invention, the programmable logic device is provided as two or more programmable processing elements (PPEs), each connected to the controller, I/O data buses and internal storage devices. More preferably, there are an even number of PPEs, provided in a symmetrical arrangement.

In another preferred embodiment of the invention, the programmable logic device consists of scalable, from one to four, field programmable gate arrays interconnected for data exchange, and access to parameter and status information storage. The means for programming, control and status reconfiguration flow preferably includes a microcontroller executing a real-time multitasking kernel with the resources for storage of a microcontroller execution program and of the configuration files for a field programmable logic device (e.g., FPGA), and a configuration controller connected with loop-cache memory for storing multiple configuration files. The means for data storage may include a number of data banks connected, preferably in a symmetrical arrangement, to each of the FPGAs through bus controllers and switches.

In a preferred embodiment of the present invention, a virtual processor module comprises: a programmable matrix array for processing data according to a hardware encoded algorithm; a plurality of local memory devices connected to the programmable matrix array for storage of the data processing parameters, processing results, control and status information; a plurality of data memory devices for storing data before, during and after processing by the programmable matrix array; a plurality of data bus controller and switch devices, responsive to the programmable matrix array, for addressing data stored in the data memory devices and for directing said data to and from the programmable matrix array; an I/O bus controller for routing outside data buses to multiple points within programmable matrix array and for delivering data to and from external sources; a plurality of configuration memories for storage of configuration files for configuring the programmable matrix array with hardware encoded algorithms; a plurality of configuration controllers, one for controlling each said configuration memory according to an operation sequence map; and a VPM controller for interaction with an external host, for sequencing configuration files to create an operation sequence map and loading the files into the configuration memories, for programming configuration controllers, for communicating with the programmable array matrix and delivering control information and parameters necessary for data processing from the local memory devices, and for reading results of the processing and status information; wherein an execution of a complex operation can be achieved by dividing it into a series of simpler operations, each executable by a configuration file provided to the programmable matrix array through partial or complete reconfiguration, transparently to the user.

The present invention also provides methods for processing data by executing complex operations by using a series of simpler operations, each of which can be configured in a programmable processing element to process the data in a series of configurations. Thus, in one embodiment of the invention, a method for processing data for a specific application comprises: providing a reconfigurable, programmable logic matrix array comprising two programmable processing elements under the control of a real time multitasking processor; providing a plurality of configuration files, each file for configuring the logic matrix array to perform an algorithm for processing data; sequencing a plurality of configuration files to perform a complex operation and for preparing an operation sequence map to control the configuration of the logic matrix array in said sequence; providing a sequence operation map and a sequence of configuration files to configure each programmable processing element to process data in accord with the respective sequence maps; configuring the two programmable processing elements with a first configuration for each programmable processing element and processing data with the two programmable processing elements in a synchronous mode; and for each programmable processing element, after the data is processed by one configuration of the element, reconfiguring the element with the next configuration file in the sequence and continuing to process data until the operation sequence map is completed for both of the two elements.

When the operation sequence map for each programmable processing element contains the same number of configuration files, the first configuration for both elements can be configured synchronously and data can be processed in both elements synchronously, and each subsequent configuration for the two elements can be configured in parallel and operated synchronously so that each of the two elements completes its operation processing sequence at substantially the same time.

When the operation sequence map for each programmable processing element contains a different number of configuration files, one or more pairs of configuration files consisting of a configuration file from each operation sequence map can be designated as a locked pair to be configured in its respective processing element at the same time as the matching configuration file of the pair is configured in its processing element so that data can be processed simultaneously by the elements in accord with designated locked configurations configured by the locked pair, each element being reconfigured in accord with the configuration files in its respective operation sequence map and processing data independently for configurations in the sequence between the configuration files designated as a locked pair.

In another embodiment of the invention, a method for processing data for a specific application comprises: providing a reconfigurable, programmable logic matrix array comprising two programmable processing elements under the control of a real time multitasking processor; providing a plurality of configuration files, each file for configuring a programmable processing element to perform an algorithm for processing data; sequencing a plurality of configuration files to perform a complex operation and for preparing an operation sequence map to control the configuration of each processing element in accord with said sequence; providing a sequence operation map and a sequence of configuration files to alternately configure each programmable processing element to process data in accord with the sequence map; configuring a first programmable processing element with a configuration; configuring the second programmable processing element with its first configuration while processing data with the first processing element; and, alternately, configuring a first programmable processing element with a configuration while processing data with the second programmable processing element and, then, configuring the second programmable processing element with a configuration while processing data with the first programmable processing element until the operation sequence map is completed for the two processing elements.

The method for processing data can also include a fault detection and recovery mode. When a fault is detected in the processing of one of the processing elements, the method includes: reconstructing the sequence of configuration files to operate on the other processing element and reconstructing the sequence operation map accordingly; and continuing to alternately reconfigure the other processing element and then process data with that processing element until the operation sequence map is completed on that processing element.

In another embodiment of the invention, a method for processing data for a specific application comprises: providing a reconfigurable, programmable logic matrix array under the control of microprocessor, preferably operating a multitasking real-time kernel; providing a library of configuration files, each file for configuring the logic matrix array to perform an algorithm for processing data; sequencing a first plurality of configuration files to perform a complex operation and for preparing an operation sequence map to control the configuration of the logic matrix array in said sequence; providing a operation sequence map to configure the logic matrix array to process data in accord with the sequence of configuration files specified by the operation sequence map; configuring the logic matrix array with a first configuration file and processing data in accord with the algorithm provided by the first configuration file and, after the data is processed by one configuration file, reconfiguring the logic matrix array with the next configuration file in the operation sequence map and continuing to process data until a programmed criteria is satisfied, thereby generating a configuration dependent operational event signal; obtaining a next configuration opcode from the logic matrix array in response to the configuration dependent operational event signal; locating a second plurality of configuration files in the library which are identified by the next configuration opcode; sequencing the second plurality of configuration files and preparing a second operation sequence map for the second plurality of configuration files; and configuring the logic matrix array with the second plurality of configuration files in accord with the second operation sequence map to continue processing data.

In accord with this invention, an effective, economical, reliable and performance expandable data processor can be achieved. Other features and advantages of the invention will occur to those skilled in the art from consideration of the following detailed description of the invention including the preferred embodiments and the accompanying drawings.

BRIEF DESCRIPTION OF THE DRAWINGS

FIGS. 1a–1c illustrates a comparison in functionality implementation between a Virtual Processor Module in accord with the present invention and typical prior art solutions.

DETAILED DESCRIPTION OF THE INVENTION

Figure 1C:
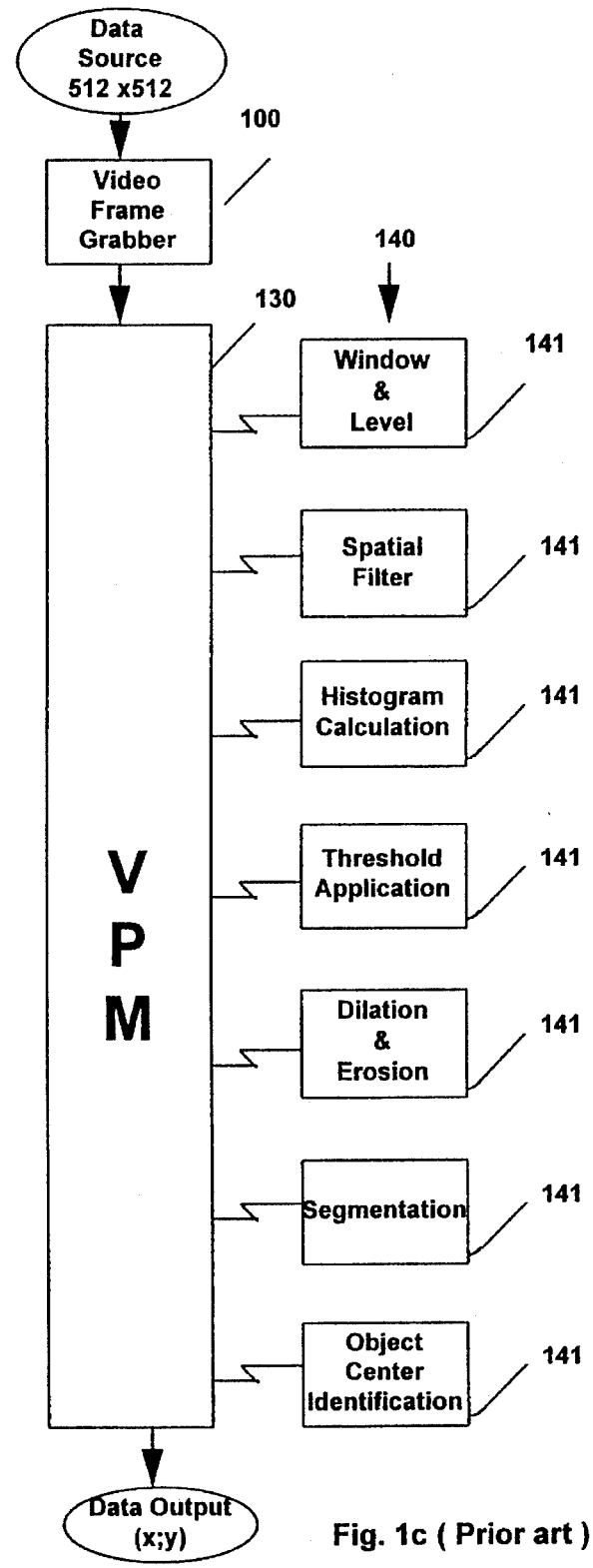

In accord with the present invention, a virtual processor module ("VPM") is provided having a programmable logic device. The term "programmable logic device", as used in this specification, means an operational logic device that can be reconfigured in accord with a programmed configuration file to perform an algorithm to accomplish any of plurality of functions or operations on a set of data. An example of such a programmable logic device useful in the practice of the present invention is an FPGA. The VPM also has controllers that control the sequence of real time programming of the logic device with specific configuration files, check the operational status of the logic device, and provide operation parameters and controls data flow to the logic device. Preferably, the control functions for the virtual processor module are performed by a VPM controller that provides supervisory control for the module, a configuration controller that handles reconfiguration of the programmable logic device in accord with processing needs and a data bus controller that provides ready access to internally stored data as required by the processing needs. The VPM preferably has one or more storage devices, or access to such storage devices, for storing data between operations and storing operation parameters for the logic device for easy access as needed for continuous processing.

In certain preferred embodiments, the programmable logic device comprises two or more PPEs, preferably provided in a symmetrical arrangement. Each PPE is preferably provided with a configuration controller, a configuration memory device, connection to an I/O bus, and connection to internal memory for storage and retrieval of data and operation parameters. The configuration memory stores a sequence of configuration files for ready access by the PPE and the configuration controller provides the configuration files to the PPE in the required sequence for processing of the data to perform the required functionality. Preferably, connections are provided between the PPEs to facilitate sequential operations on the data to provide continuous processing of the data and to enable shadow processing. The term "shadow processing", as used herein, means that one PPE is processing data while a second PPE is being reconfigured to operate on the data after the first PPE completes its operation, so that there is no interruption in the data processing. In other words, the reconfiguration of a PPE takes place in the shadow of the operation of another PPE to provide uninterrupted processing of data.

Some of the advantages of a VPM in accord with the present invention can be appreciated from a comparison example of a processing application as illustrated in FIGS. 1 and 2. The illustrated processing application is for the processing of images digitized from a video camera with a 512×512 spatial resolution at the rate of 30 frames per second with the purpose of tracking the center of an object within a field of view. As shown in FIG. 1, the following operations are expected to be performed on each frame of the image: (i) window & level for lighting compensation; (ii) spatial filter for edge enhancement; (iii) histogram calculation for optimum threshold identification; (iv) threshold application for image binarization; (v) dilation & erosion for noise filtration and contour continuity restoration; (vi) segmentation for separating the object of interest from the other objects and, finally, (vii) the identification of object center by the calculation of the center of mass.

Figure 2A:
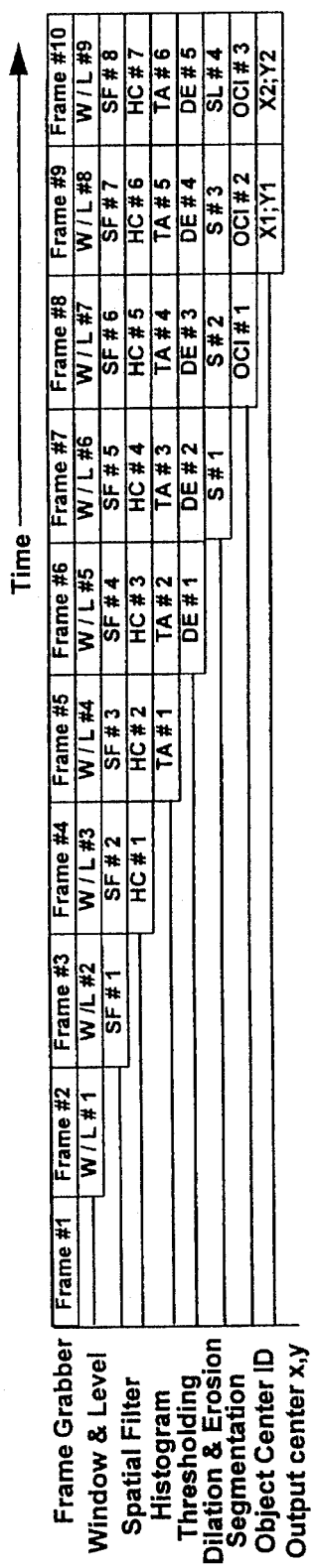
FIGS. 2a–2c illustrates a timing diagram and performance comparison chart between the Virtual Processor Module and prior art compared in FIGS. 1a–1c.
Figure 2B:
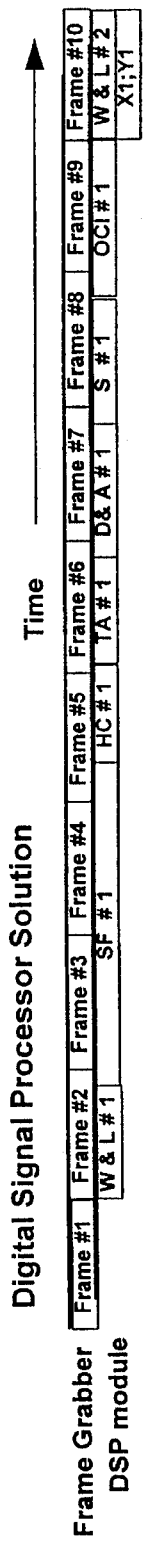
Figure 2C:
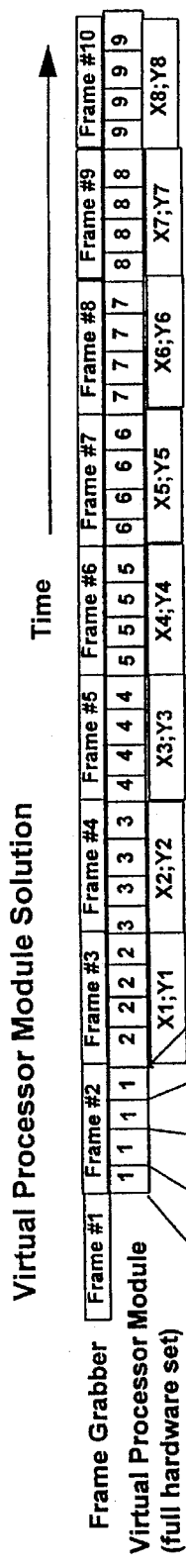
Figure 3:
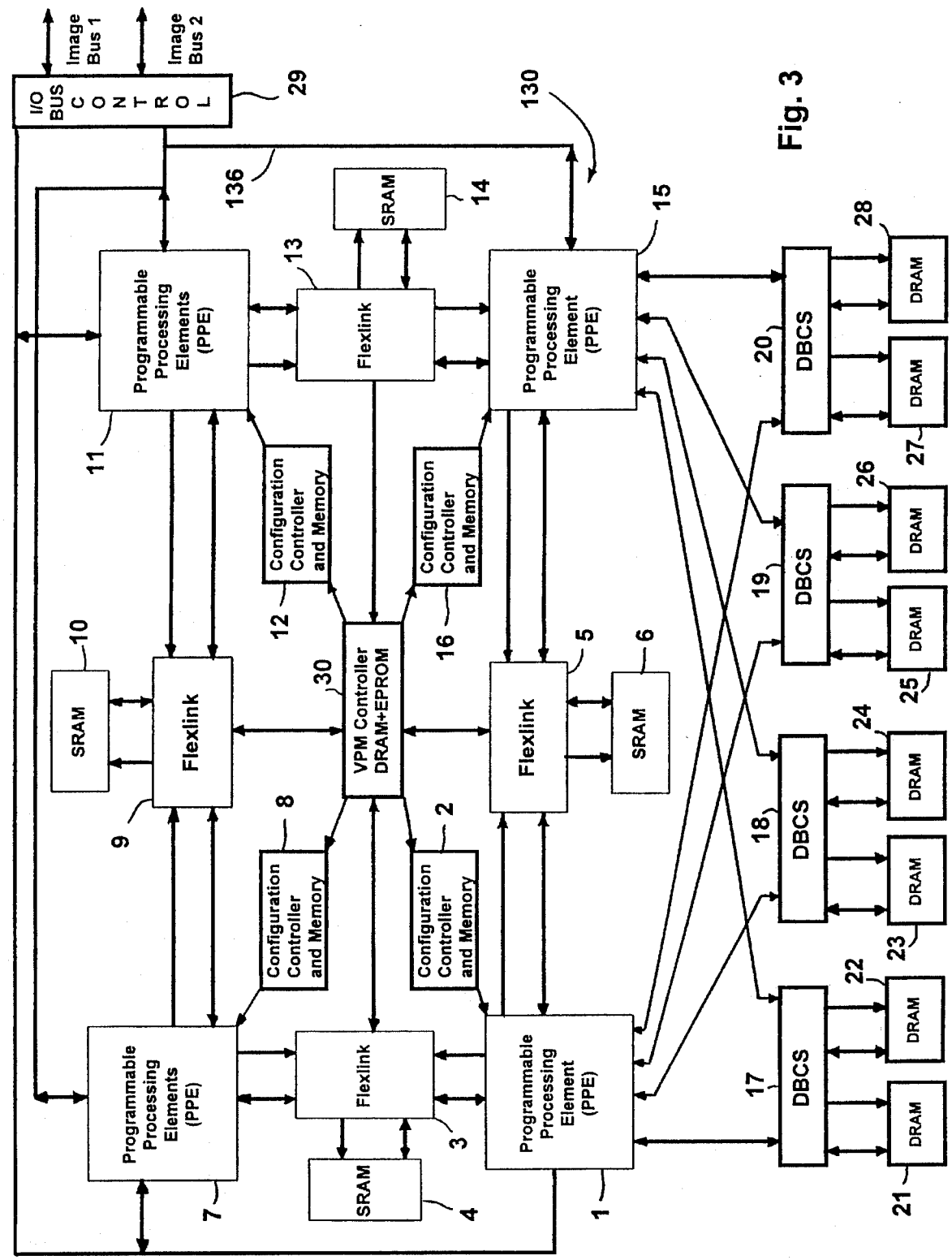
FIG. 3 is a block-diagram illustrating a Virtual Processor Module in a symmetrical hardware configuration in accord with a preferred embodiment of the invention.
Figure 4:
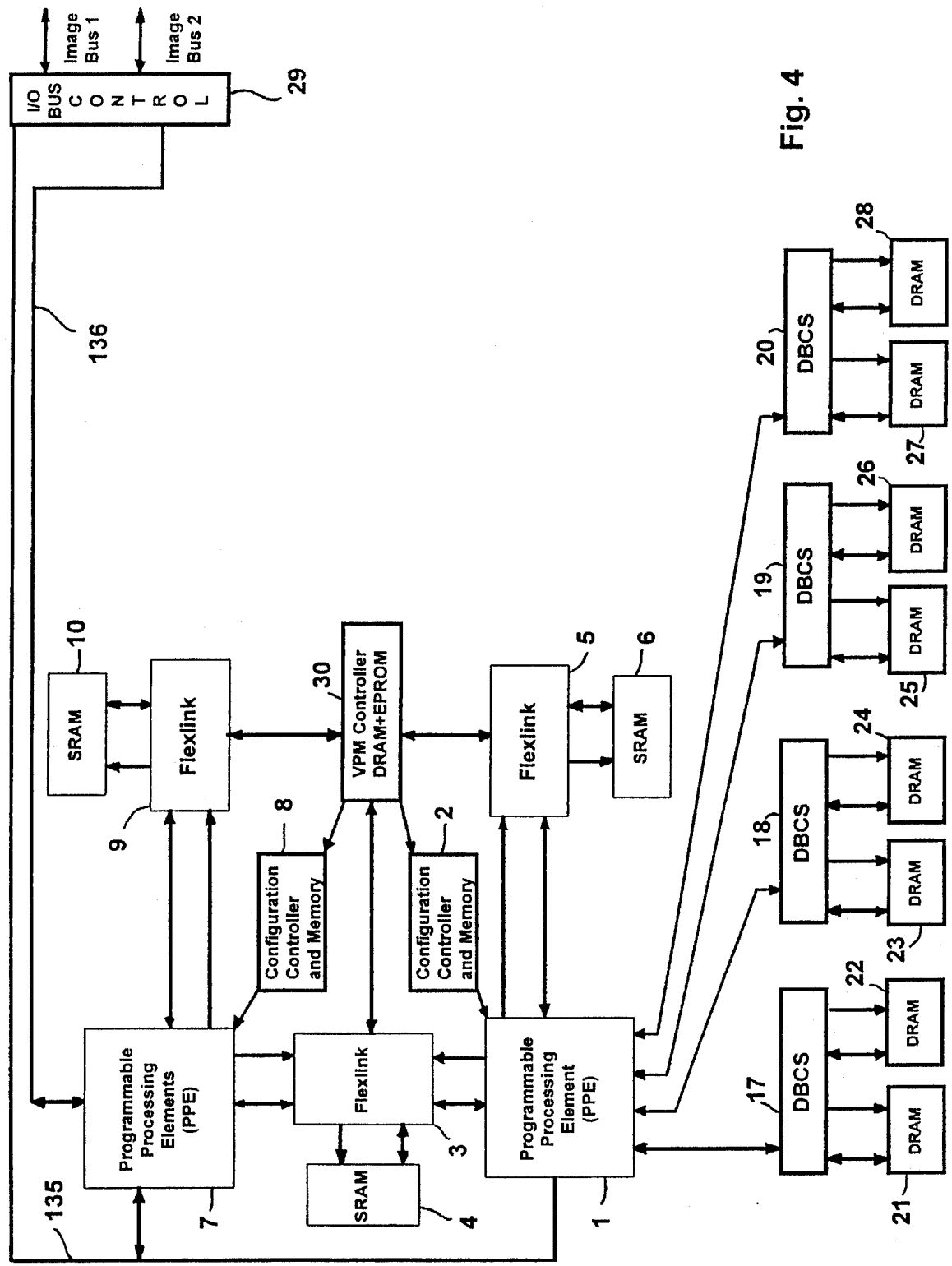
FIG. 4 is a block-diagram illustrating a Virtual Processor Module in a "left/right half" hardware configuration according to another preferred embodiment of the invention.
Figure 5:
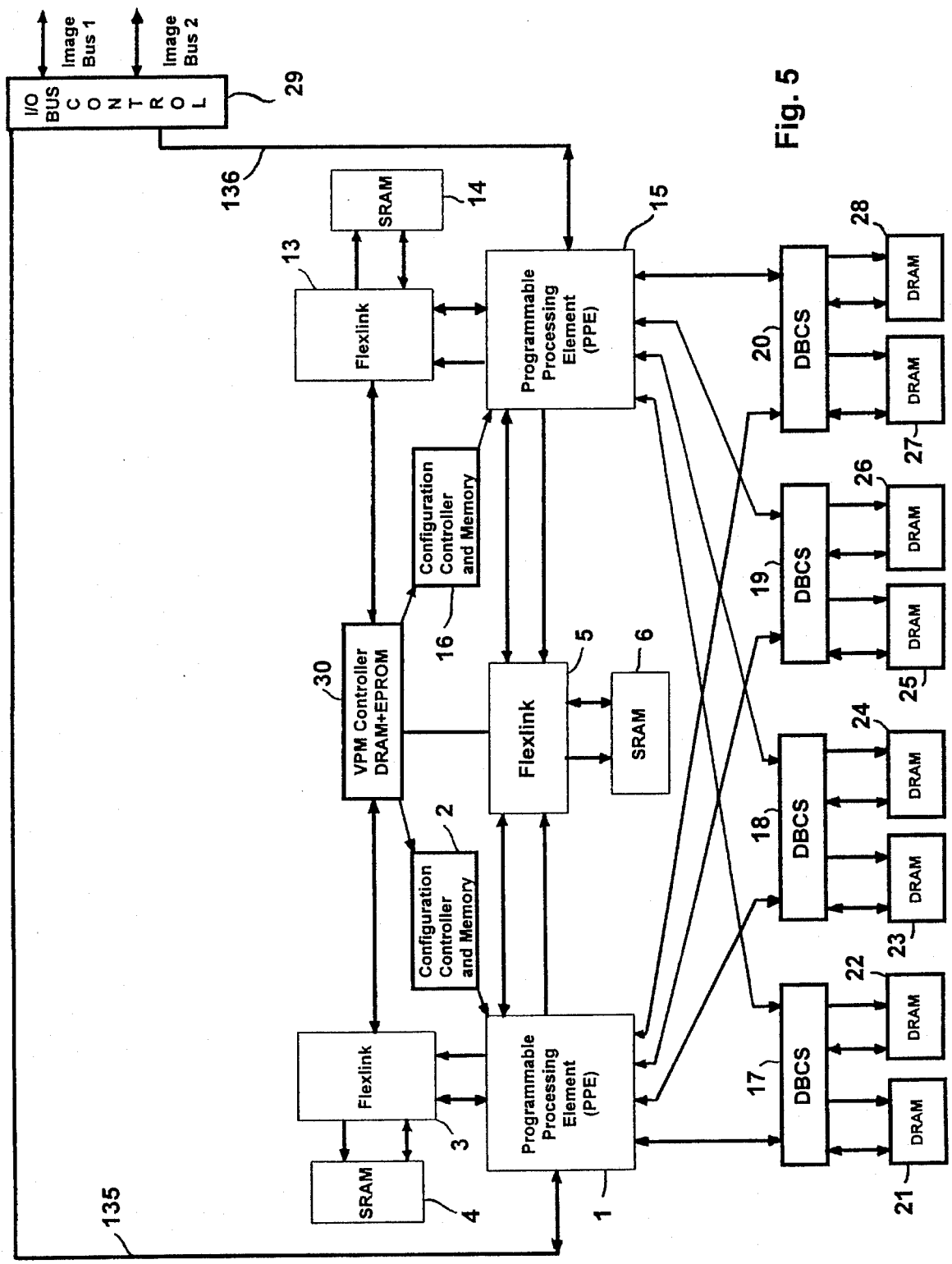
FIG. 5 is a block-diagram illustrating a Virtual Processor Module in a "lower half" hardware configuration according to another preferred embodiment of the invention.
Figure 6:
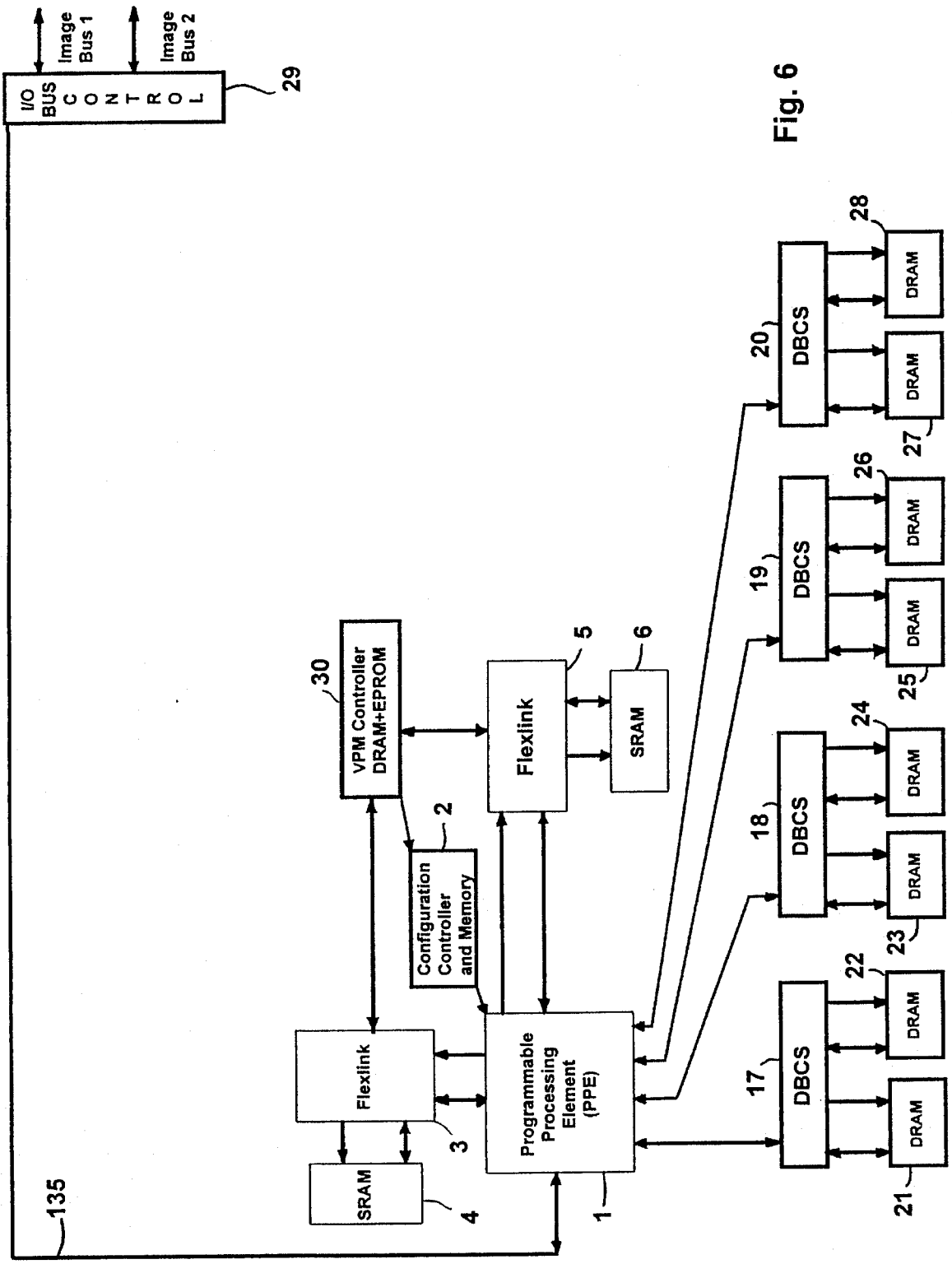
FIG. 6 is a block-diagram illustrating a Virtual Processor Module in a "quarter" hardware configuration according to another preferred embodiment of the invention.

FIGS. 1a–1c compare a typical prior art Custom Hardware solution and a typical prior art Digital Signal Processor (DSP) solution with a solution in accord with the present invention using a VPM as illustrated in FIG. 3. In the Custom Hardware solution, each function is represented by an optimally designed hardware module 100, one for each of the above operations, and the modules are interconnected in typical pipeline fashion to support simultaneous transfer of data between all neighbors in the pipeline. In the DSP solution, data is processed in sequential fashion by a single general purpose ALU (part of the DSP module 110) executing software routines 121, one for each operation, from a DSP Software Library 120. In the VPM solution ("full" hardware set as shown in FIG. 3), data is processed in a sequential fashion by VPM 130, however, through a highly optimized PPEs, with image memory access implementation for a particular function being executed at any given moment of time. Each operation is accomplished by a sequence of configuration files 141, which are accessed from a configuration library 140. Each sequence of configuration files is pre-organized in accord with a configuration map to perform the above operations. This application can be performed by the VPM using four configurations as illustrated in FIG. 2. Configuration 1 is a hardware realization of the Window & Level and the Spatial Filter operations, combined. Configuration 2 is a hardware realization of the Histogram Calculation and the Threshold Application operations, combined. Configuration 3 is a hardware realization of the Dilation & Erosion and the Segmentation operations, combined. Configuration 4 is a hardware realization of the Object Center Identification operation.

The performance advantage of the VPM solution is illustrated in FIGS. 2a–2c. Although the Custom Hardware solution and the VPM solution keep up with a 30 frames per second processing rate, the DSP solution is typically capable of processing only 3–4 frames per second. However, when compared to the VPM solution, the Custom Hardware solution requires 7 custom modules at greater expense and generates an 8 frame delay between an input data and output result which is critical for closed-loop applications. The VPM solution generates the result with only a 2 frame delay and provides a single module solution without need for massive pipeline system implementation.

A Virtual Processor Module (VPM), in accord with one embodiment of the present invention, is shown in FIG. 3. The VPM 130, typically, is configured as a plug-in board on a common backplane in a computer. However, for embedded applications, the VPM can be configured as a computer, itself, interacting with data through I/O bus controller 29 and receiving command protocols from the user through VPM Controller 30. When configured as a plug-in board, the I/O bus controller function is provided by the computer and its backplane data bus management.

The VPM in a type of "full configuration" as illustrated in FIG. 3 includes a (i) VPM Controller 30, which preferably includes a standard commercial microprocessor interconnected with EPROM and DRAM, (ii) Programmable Processing Elements ("PPE") 1,7,11,15, which provide a programmable matrix, and (iii) configuration controller and memory units 2,8,12,16. The EPROM (i) contains application related software for interaction with an external host or other peripheral control device, (ii) preferably also contains a multitasking, real-time execution kernel, and (iii) also can contain a library of configuration files necessary to provide the functionality of the PPEs. The VPM controller 30 controller 30 is used to build and supply a stream of configuration files and operation sequence maps to the configuration memories and controllers 2,8,12,16; to interact with PPE's 1,7,11,15 to control their configuration sequence process; to download coefficients and parameters necessary for data calculations in PPEs 1,7,11,15 and to read the status and results of processing from SRAM's 4,6,10,14 through Flexlinks 3,5 9,13.

Configuration memories and controllers 2,8,12,16 are preferably used in the VPM for buffering a number of configuration files which can be loaded to PPEs 1,7,11,15 upon their request without delay and at the maximum PPE configuration speed producing minimum overall delay for the processing. In the case when a function processing loop is less than or equal to the depth of the configuration memories and controllers 2,8,12,16, as shown in and discussed in connection with FIG. 11, the VPM controller 30 preloads configuration files and operation sequence maps to configuration memories and controllers 2,8,12,16 and sets them to execute without further involvement by the VPM controller. This is preferred for processing of small data sets through a number of operations where the frequency of PPE configuring is high, thereby eliminating a source of high demand on the VPM controller 30 performance and eliminating or reducing a potential process bottleneck.

The programmable matrix, in accord with this embodiment of the invention, consists of four PPEs 1,7,11,15 (preferably, FPGAs), which are preferably interconnected with SRAM's 4,6,10,14 and the VPM Controller 30 data bus through bi-directional symmetrical Flexlinks 3,5,9,13. The Flexlink is a logic device having the functionality of a direct memory access controller and a crossbar switch, which connects components of the VPM based on an instruction or a request from a component. When the PPEs are configured, for example, by the configuration controller using configuration files and an operation sequence map for performing the Spatial Filter operation, they become a custom designed hardware convolving circuit with the required number of parallel multipliers and accumulators (function of the kernel), hardwired for a spatial filtering state machine and optimally designed for providing a spatial filtering image memory interface. However, when the PPEs and are reconfigured using configuration files and an operation sequence map for the Dilation & Erosion operation, they become a custom designed hardware implementation of the dilation and erosion functions with the required number of parallel logical functional blocks (function of the structural element) of appropriate operand size (one bit-for binary images, more for gray scale images), hardwired for a dilation & erosion state machine and optimally designed for providing a dilation & erosion image memory interface.

The flexlinks are preferably used to provide the function of traffic control and are configured to preferably support the following data paths: direct bi-directional flow between two PPEs with only a two clock cycle delay; direct bi-directional flow between each of the PPEs and the VPM controller 30 data bus, driven and arbitrated by the VPM controller 30; bi-directional flow between each of two PPEs and the SRAM supporting random read/write, block read/write and read-, modify- or write operations from a PPE; and bi-directional flow between the VPM controller 30 data bus and the SRAM supporting random read/write, block read/write and read-, modify- or write operations from the VPM controller 30. SRAM blocks 4,6,10,14 are preferably used as buffers for the exchange of parameters, calculation results, and status information between the PPEs and VPM controller 30, as well as for a variable size data delay line, or a look-up table ("LUT"), or for many other functions necessary for more optimal execution of data processing operations by PPEs, as will be appreciated by those skilled in the art are based on the particular application being performed by the VPM.

PPEs 1,15 are connected through four parallel buses with four DRAM Bus Controller & Switch units ("DBCS") 17,18,19,20, which are connected to DRAM Block pairs 21 and 22, 23 and 24, 25 and 26, and 27 and 28, respectively. Thus, each DBCS is preferably connected to an address and data bus consisting of at least two DRAM blocks. The DBCS translates requests for random, or block read or write, operations from the PPE's control signals and a multiplexed address/data bus into an appropriate timing and control sequence to perform random or block read or write to a selected single DRAM block or to both blocks. In the random mode, the PPE sends to a DBCS a complete address through the multiplexed address/data bus on every memory cycle. In block mode, the PPE preloads an address index to the DBCS, which generates an appropriate row/column address to selected DRAM blocks on every memory cycle. In this mode, the PPE-DBCS bus is used for data communications. The DBCS also refreshes the DRAMs while the PPEs are reconfiguring as well as when the PPEs allow such refreshing during processing. Such DRAM memory access organization is optimized for processing of sequentially organized large blocks of data while, however, permitting the manipulation of data in a flexible fashion whenever necessary. The refresh feature allows the DRAM blocks to be used for internal data storage while the PPEs are reconfigured for the next function.

Symmetrical and independent connection of PPEs 11,15 to each DBCS is important for some execution sequences, as illustrated in FIG. 10 through FIG. 14. Most importantly, such connection allows an independent reconfiguration of PPEs 11,15 as well as sharing of the data when the PPEs are simultaneously operational.

However, to provide high-speed direct data communications between I/O modules such as the Video Frame Grabber in FIG. 1 and the PPEs as required by processing flow, preferred direct Input/Output (I/O) bus connections such as I/O buses 135,136 are provided to all four PPEs.

The interconnection of PPEs in a symmetrical closed matrix permits several hardware configurations to be implemented as shown in FIG. 3 through FIG. 6 (for variable complexity and lower cost VPM implementations) with preferred layout of connections to the VPM controller 30, flexlinks, SRAMs, DRAMs and I/O busses. Such preferred hardware configuration allows for flexibility in processing modes, as will be described hereinafter, and provides for a redundancy feature in the case of a circuit fault detection scheme.

Figure 7:
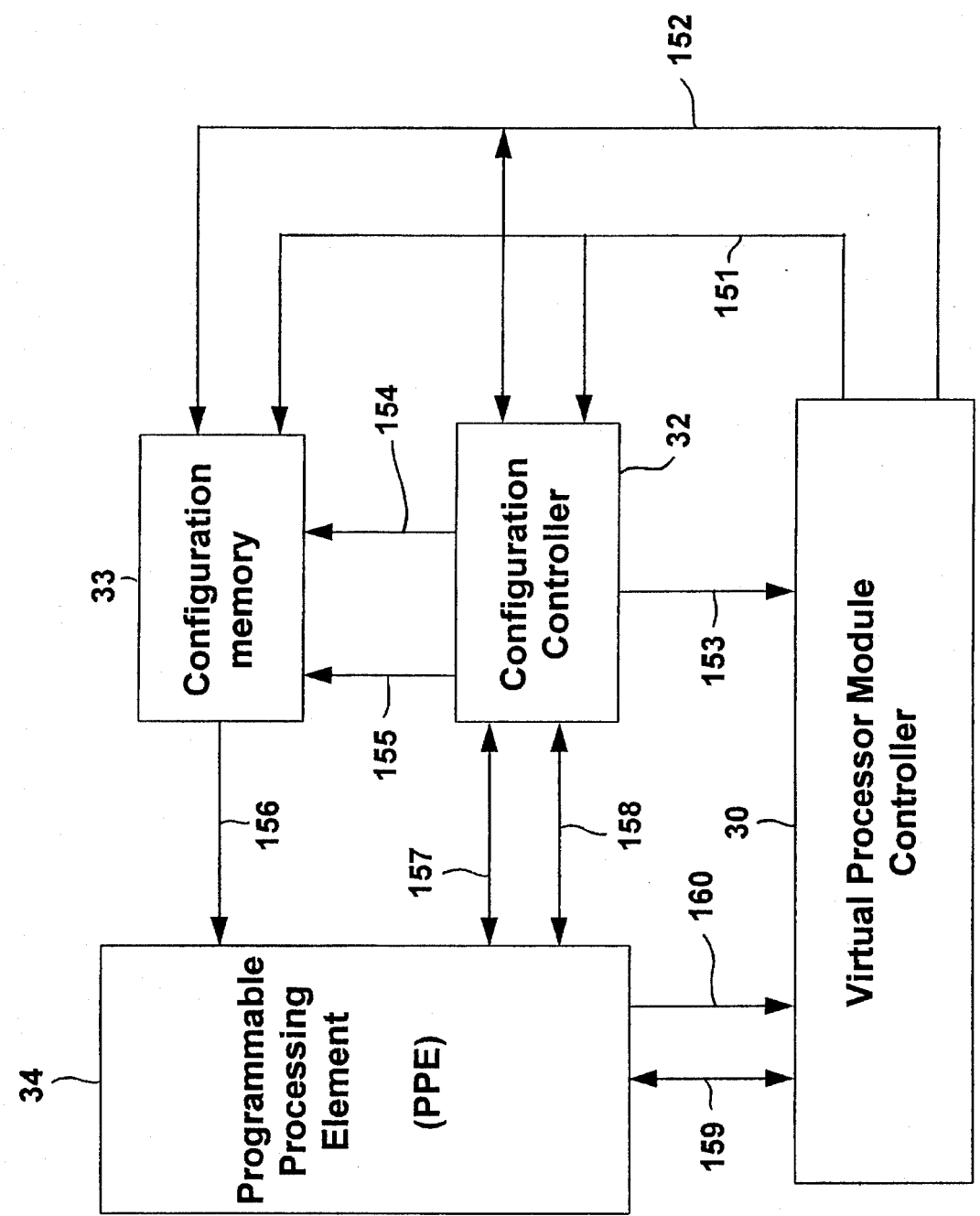
FIG. 7 is a detailed block-diagram illustrating the control section of a Virtual Processor Module of FIGS. 3–6 relating to connections illustrating reconfiguration and operational interaction process between the FPGA connected, the associated configuration files loop-cache memory, the configuration controller and the VPM controller.

The VPM control operations are illustrated in further detail in FIG. 7. In FIG. 7, the configuration memory and controller unit (illustrated as units 2,8,12,16 in FIG. 3) is illustrated as separate components, i.e., configuration controller 32 and configuration memory 33. Connections between the VPM controller 30, the configuration controller 32, the configuration memory 33 and a PPE (one of four shown in FIG. 3 as 1,7,11,15) are shown. The VPM controller 30 is connected by VPM Address bus 151 and VPM Data bus 152 to the configuration memory 33 to allow the loading of the configuration files. The VPM controller 30 also is connected to configuration controller 32 by VPM Address bus 151 and VPM Data bus 152 to allow the transfer of the configuration files operation sequence map and to monitor configuration controller 32 status information. Configuration controller 32 is connected to the VPM controller 30 by bus 153 to provide a Programmable Event signal, for example, End-of-Loop or End-of-Configuration to stimulate further VPM actions. Configuration controller 32 is connected to configuration memory 33 by configuration files selection bus 154 to select an individual file for downloading to the PPE and by configuration data address bus 155 for sequencing configuration data within a configuration file while downloading it to the PPE. The configuration memory 33 is connected to the PPE by configuration file data bus 156 for transfer of configuration file data to the PPE. Configuration controller 32 is connected to the PPE by bus to provide bi-directional configuration handshake signals necessary to control the download of the configuration data and its successful completion. Configuration controller 32 is also connected to the PPE by bus 158 to provide bi-directional Request for termination handshake signals necessary for PPE transition from operational mode to the reconfiguration mode. The VPM controller 30 is connected to the PPE by bus to provide configuration dependent operational event signals necessary for functional synchronization between respective components. The VPM controller 30 is also connected to the PPE by a Requested Configuration Opcode bus 160, which is necessary to execute a data-dependent execution sequence when the next function is determined based on meeting a parameter that has been preprogrammed in the configuration file as an parameter event and called for through the Opcode bus 160.

Figure 8:
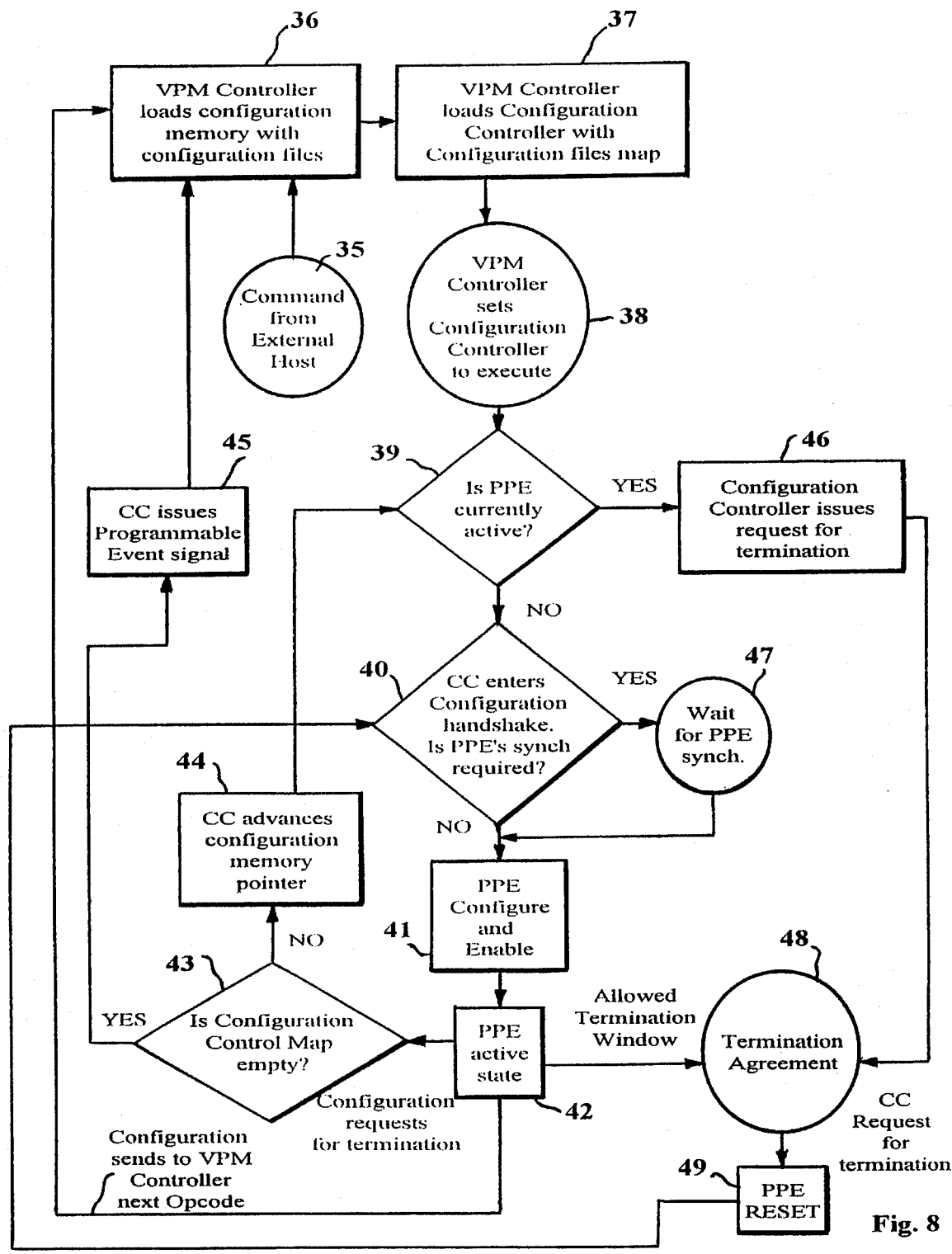
FIG. 8 is a flow chart illustrating the logical interaction between components for the Virtual Processor Module as shown on FIG. 7 for a reconfiguration process in full or partial synchronization modes.

FIG. 8 illustrates the logic process of interaction between the components, as illustrated in FIG. 7, for VPM control when four, or two pairs of, PPEs reconfigure and operate in an optional synchronization mode. Based on commands from an external host, step 35, or preprogrammed sequence in the VPM controller 30 EPROM (FIG. 3), the VPM controller 30 loads configuration memory 33 with configuration files, step 36. Then VPM controller 30 loads configuration controller 32 with a configuration files operation sequence map, step 37, and enables configuration controller for execution, step 38. Configuration controller 32 checks "Is PPE currently active?", step 39. At this point, the answer is "No" because the VPM is in the start-up routine. Configuration controller 32 enters a configuration handshake with PPE 1 verifying first whether the configuration operation sequence map specifies PPE synchronization with other PPEs, step 40. If synchronization is required, then configuration controller 32 waits for the "ready for configuration" signals from the other PPEs, step 47, and then proceeds to configure and enable appropriate PPEs for operation, step 41.

When a PPE enters the operational state, step 42, there are three ways that the operation can be terminated. First, in a Host sequence / Configuration timing mode, the request for termination is part of a preprogrammed configuration operation sequence set by the VPM controller 30. The PPE, which is currently executing in a specific configuration operation, decides when to request termination and issues a Configuration request for termination. This leads to step 43 and the configuration controller 32 checks "Is Configuration Control Map empty?". If the answer is "No", then configuration controller 32 advances the memory pointer to select the next configuration file in the operation sequence map, step 44, and then proceeds to check "Is PPE currently active?", step 39. In this case, the answer is "Yes" because active configuration has requested termination in step 42. Configuration controller 32 then proceeds to issue a request for termination, step 46, which leads to the Termination Agreement, step 48, at the appropriate time during an Allowed Termination Window by the PPE. This is important because, in some cases, the processing function can not be interrupted; otherwise, it will leave communications with Flexlinks 3,5,9,13 or DBCSs 17,18,19,20 (FIG. 3) in an unfinished state causing a disruption in the operation of the next configuration. As soon as Termination Agreement is reached, a PPE pair or both pairs (depending on configuration files operation sequence map) will be Reset, step 49. Configuration controller 32 enters a configuration handshake, step 40, and proceeds to download the next configuration. Returning to the step 43, if the answer is "Yes", then configuration controller 32 issues an end-of-loop programmable event signal, step 45, which leads to VPM controller 30 proceeding to the execution of the new loop. However, the VPM controller 30 preferably preloads the next loop while previous loop is being executed.

Second, in a Configuration driven mode, when a sequence is driven by the processing itself, for example, network protocol or data dependency, then, VPM controller 30 waits for the PPE to generate an operational event signal and send a Next Configuration Opcode value over bus 160 (see FIG. 7). Upon receiving the opcode value, the VPM controller 30 finds the configuration file with that opcode and loads it to the configuration memory 33, step 36.

Third, in a Host-driven mode, a preprogrammed sequence by VPM controller 30 decides when to terminate the currently executing configuration. In this mode, the PPE indicates to the configuration controller 32 an Allowed Termination Window but termination will take place only when configuration controller 32 issues a request for termination based on the control information received from VPM controller 30, step 46.

Figure 9:
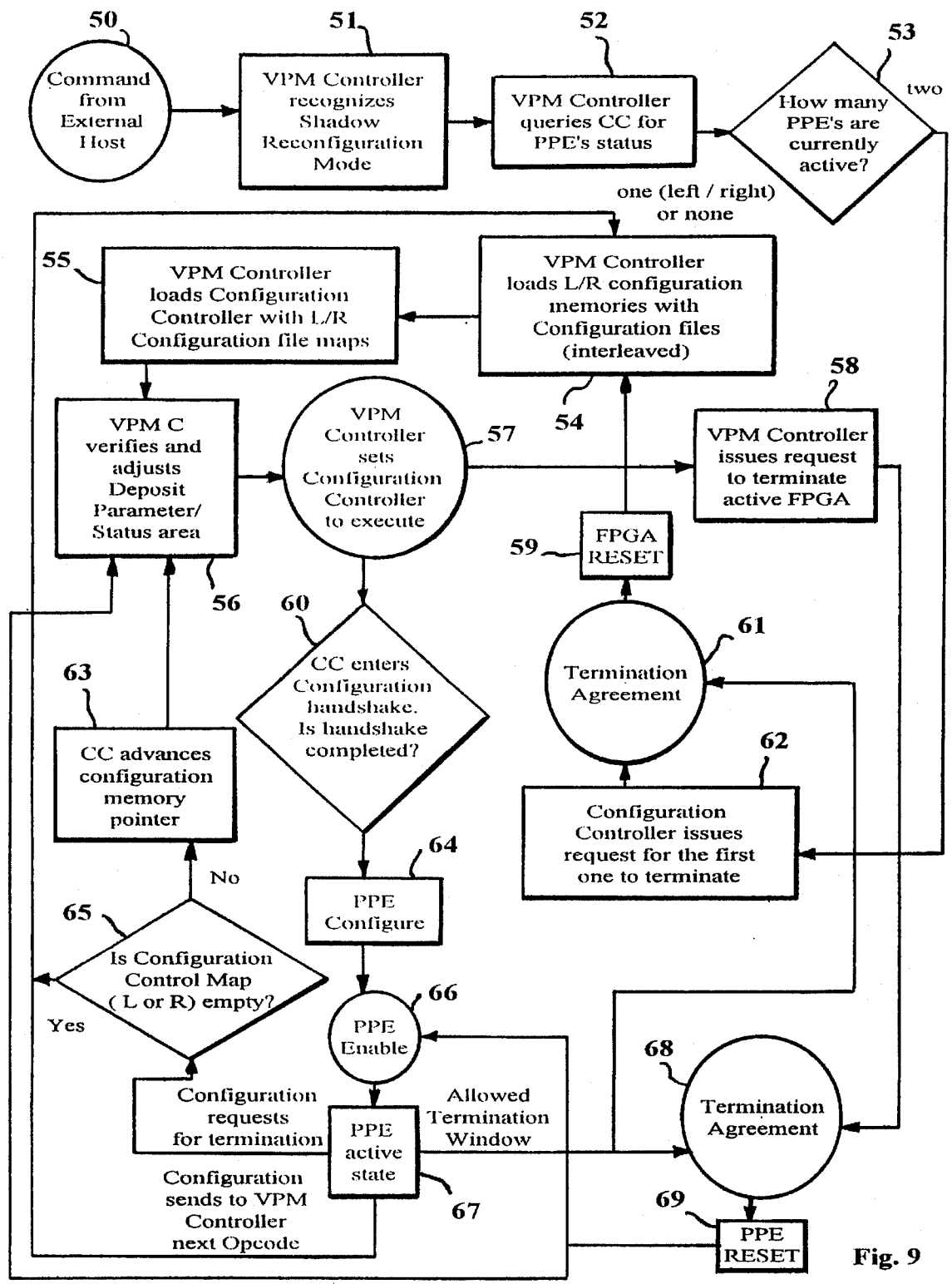
FIG. 9 is a flow chart illustrating the logical interaction between components for the Virtual Processor Module as shown on FIG. 7 for a shadow reconfiguration process which can be performed by the hardware configurations illustrated in FIG. 3 and FIG. 5.

FIG. 9 illustrates the logic process for interaction between the components shown in FIG. 7 for a Shadow Reconfiguration Process when, for example, PPE pairs 1,7 and 15,11 (FIG. 3), or PPEs 1,15 (FIG. 5), alternately operate over the same data set creating one continuous processing flow by hiding reconfiguration of one PPE while the other operates. Similar to FIG. 8, based on commands from an external host, step 50, or preprogrammed sequence in the VPM controller 30 EPROM, VPM controller 30 recognizes a Shadow Reconfiguration Mode, step 51. Then, VPM controller 30 queries configuration controller 32 for the PPE's status, step 52. Configuration controller 32 provides VPM controller 30 with the PPE status, step 53. If both PPEs (left and right) are active, then configuration controller 32 issues a request for either one to terminate, step 62, based on which one first sends an Allowed Termination Window. This will lead to the Termination Agreement, step 61, and PPE Reset (reconfiguration), step 59. If the status from step 53 indicates that only one or none of the PPEs is active, which means that at least one of the PPEs is Reset, equivalent to the condition after step 59, then VPM controller 30 loads configuration files to the configurations memory on the side with Reset PPE, step 54. Then, VPM controller 30 loads configuration controller 32 with the appropriate configuration files operation sequence map, step 55. Next, VPM controller 30 checks the Deposit Parameter / Status area to verify whether the previous configuration has successfully completed its operation, step 56. In case VPM controller 30 finds a problem with the Parameter / Status area, a determination is made regarding the necessity of a transition to the fault recovery mode (which is discussed in connection with FIG. 14). Then, VPM controller 30 sets configuration controller 32 to execute the configuration operation sequence map, step 57. Configuration controller 32 enters a configuration handshake with, for example, the left side PPE 1 (FIG. 5), until a handshake is acknowledged, step 60, and simultaneously issues a request for termination for the active PPE 15 (FIG. 5), step 58. Now, while configuration controller 32 is configuring PPE 1, step 64, it waits for the Termination Agreement with PPE 15, step 68, followed by the PPE Reset, step 69. After the completion of the configuration, configuration controller 32 enables PPE 1, step 66, and if step 69 is executed or if PPE 15 becomes inactive some time before step 66, then configuration controller 32 enables PPE 1 which goes into active state, step 67.

Now, similar to FIG. 8, several possibilities for termination exist. First, in a Host sequence / Configuration timing mode, when a preprogrammed sequence by VPM controller 30 is currently executing a configuration decides to request termination, then, configuration controller 32 executes through steps 56,57,60,64 and on to step 66 to activate the next configuration. At the same time, PPE 1 executes through steps 65,63,56,57,58,68,69 and on to step 66 or, if the configuration operation sequence map is complete, then steps 65,54,55,56,57,58,68,69 and on to step 66.

Second, in a Configuration driven mode, when a sequence is driven by the processing itself (for example network protocol or data dependency), then VPM controller 30 waits for PPE 1 to send an opcode for the next configuration. The next configuration is fetched in step 54 and processing proceeds through steps 55,56,57. Then, step 58 is initiated and processing continues to steps 60,64 and on to step 66. In parallel, step 58 leads to steps 68,69 and on to step 66.

Third, in a Host-driven mode, when a preprogrammed sequence by VPM controller 30 decides to terminate a currently executing configuration, then steps 57,58,68,69 and on to step 66 are always executed in parallel with steps 57, 60,64, and on to step 66.

For a more general explanation of the three operational modes described above, see FIG. 10 through FIG. 14. In FIGS. 10 -14. For these illustrations, L1 through L13 represent configuration files designated for PPEs 1 & 7 (FIG. 3), to which reference is made as the "left pair" and which are reconfigured, simultaneously. R1 through R13 represent configuration files designated for PPEs 15 & 11 (FIG. 3), to which reference is made as the "right pair" and which also are reconfigured, simultaneously. The depth of the configuration memory for left pair (2,8) and right pair (16,12) are illustrated as eight configuration files with VPM controller 30 handling a memory extension five configuration files deep for each pair. The memories and memory extensions are illustrated as loops for convenience in discussing the operation. However, it will be appreciated by those skilled in the art that the configuration controller can provide the appearance of a loop. Configuration controller 32 (FIG. 7) simultaneously handles left and right loops interacting with VPM controller 30 to replace executed configurations within the configuration memories with configurations from the memory extension.

Figure 10:
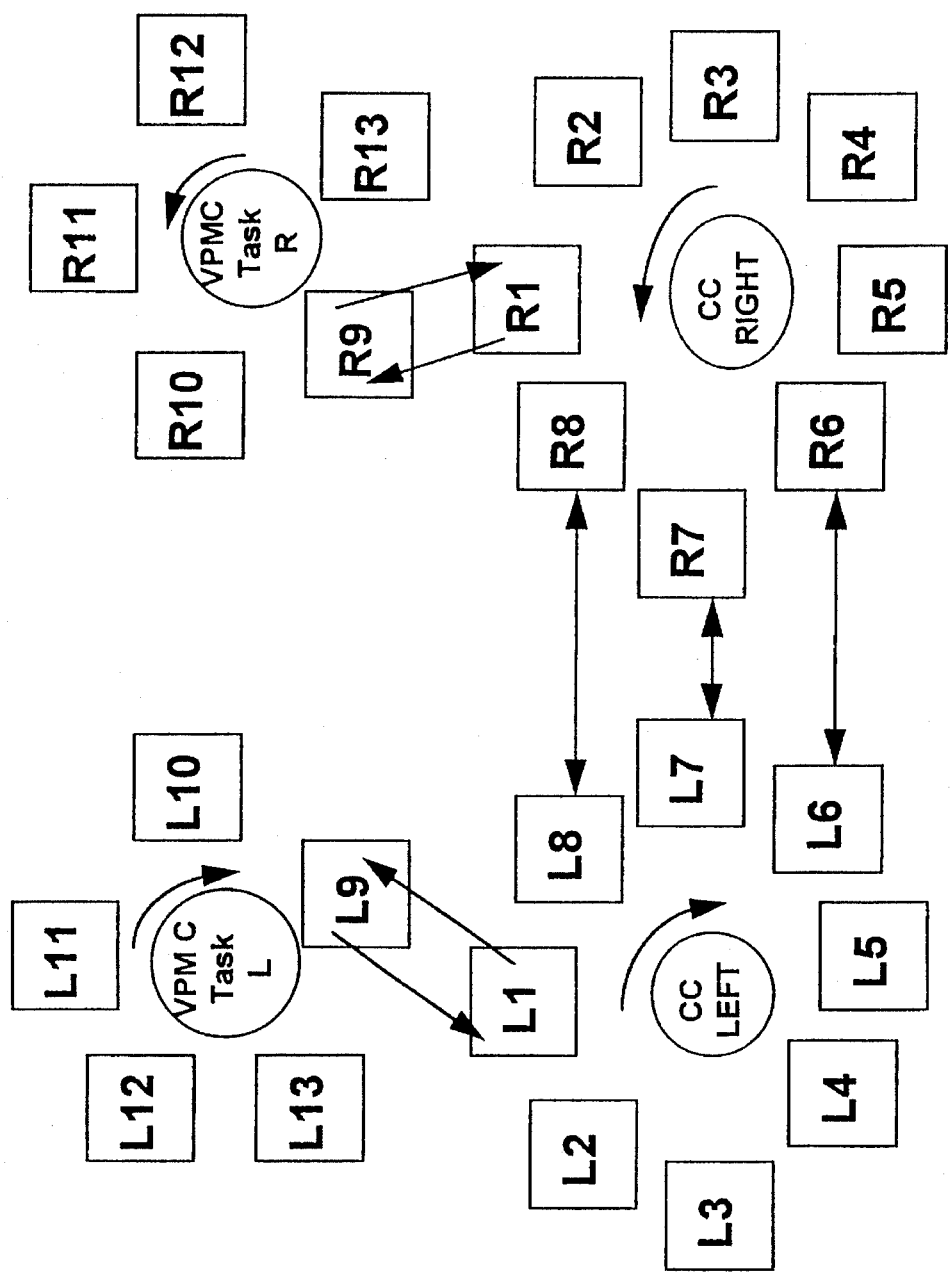
FIG. 10 illustrates a configuration (function) flow of configuration files controlled by the VPM Controller for execution by FPGAs through configuration memories for a fully synchronous left-right lock step execution process.

FIG. 10 illustrates a Host-driven mode when the PPEs 1,7,11,15 are executing a fully synchronous left-right lock step process, which means they are operational, simultaneously, and they are reconfiguring, simultaneously, advancing to the next configuration within their respective loops at the same time. The configuration memory depth is eight configuration files with a five configuration file extension provided by the VPM controller, as required for the particular functional configuration being executed in each PPE.

Figure 11:
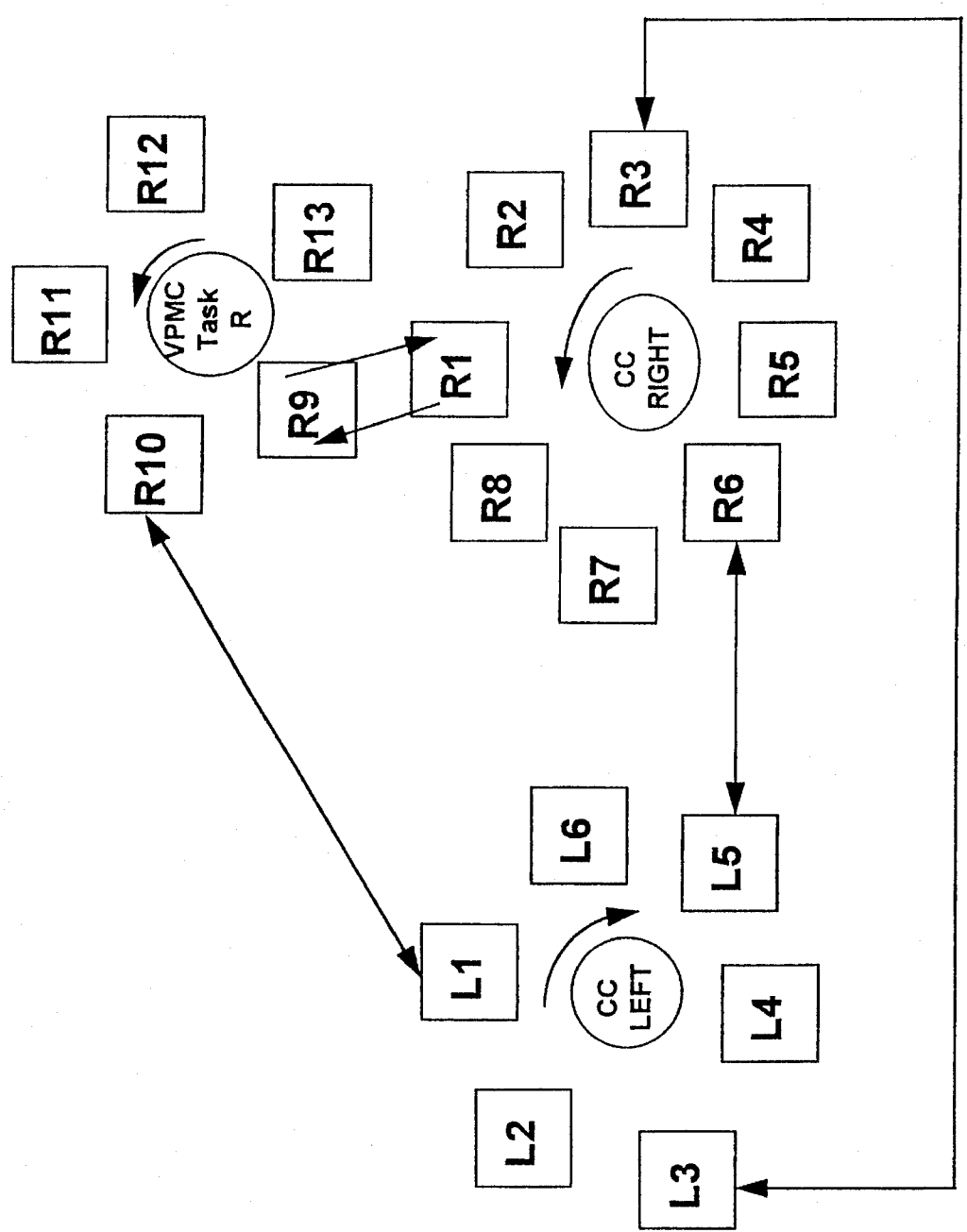
FIG. 11 is an illustration similar to that in FIG. 10 for a configuration level synchronization execution process.

FIG. 11 illustrates a Host sequence / Configuration timing mode when left and right loop are of different size. For example, as illustrated, the left loop is six deep and right loop is thirteen deep (including the five file extension). Both sequences are preprogrammed by the Host (not illustrated), however, for timing, the sequences are locked only between L1 and R10, between L3 and R3, and between L5 and R6. Each sequence or loop can proceed at its own speed driven by configuration timing, however, at the points where loops are locked, they will stop to wait for the opposite side to load the required locked configuration and, then, execute the locked configurations, simultaneously.

Figure 12:
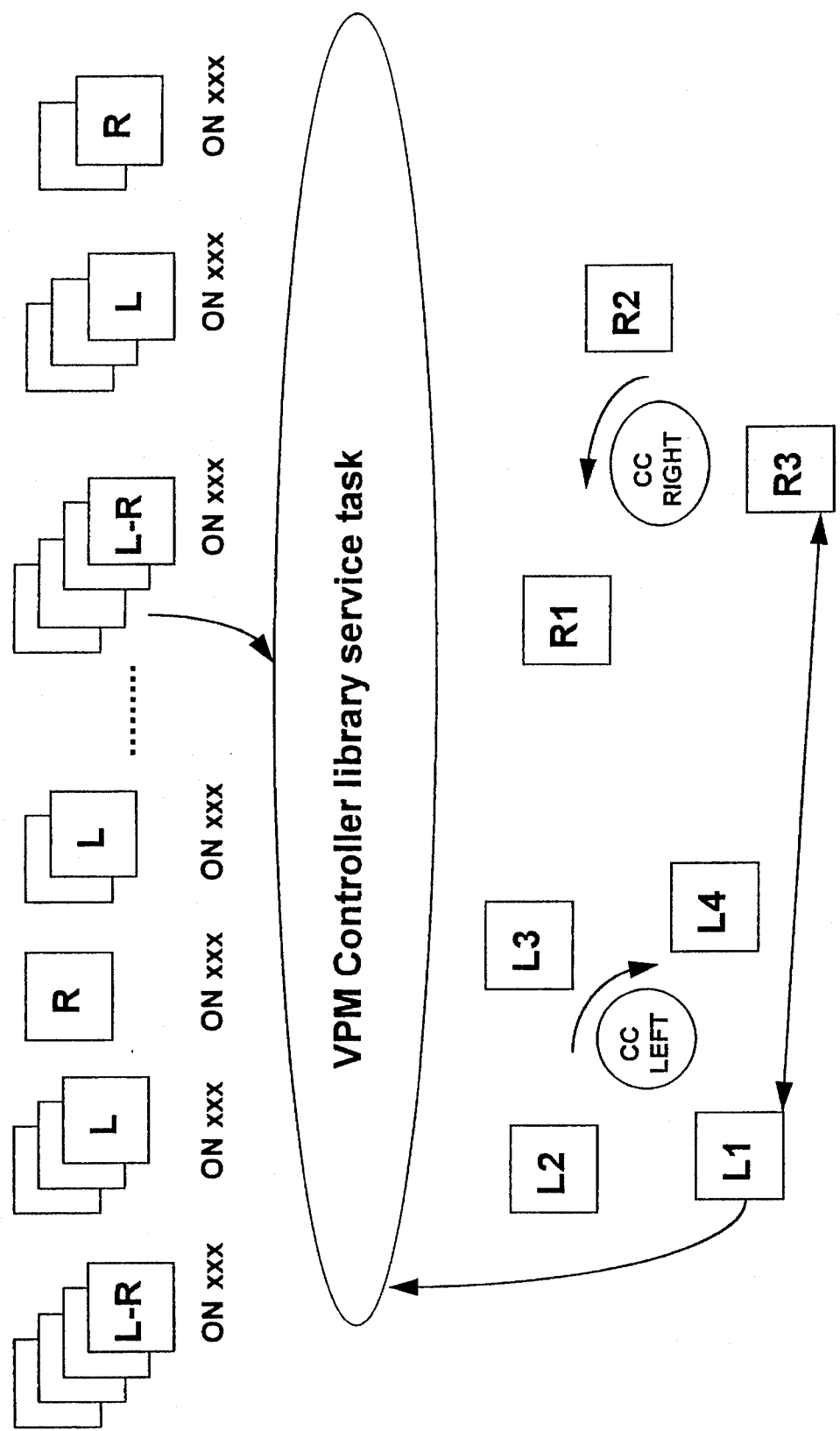
FIG. 12 is an illustration similar to that in FIG. 10 for a data dependent execution process sequence with variable (function dependent) memory depth and configuration level left-right synchronization.

FIG. 12 illustrates a Configuration-driven mode when a sequence is not preprogrammed by VPM controller 30, but is determined by matching criteria designed into configurations with data flow parameters stored in SRAM. For example, configurations R1, R2, R3 are responsible for (i) an Image acquisition from I/O bus function, (ii) a Window & Level function and (iii) a Spatial Filter function, respectively. Configurations L1, L2, L3 and L4 are responsible for (iv) a Histogram Calculation function, (v) a Threshold Application function, (vi) a Dilation & Erosion function and (vii) a Segmentation function, respectively. The configuration R3 is locked with configuration L1. However, if the Histogram Calculation function (configuration L1) determines that image data spreads only over a small part of the dynamic range, then, it will issue a request directly to the VPM controller 30 for the configuration to calculate a new scale look-up table. VPM controller 30 will match the opcode with opcodes in the configuration library and will download a new configuration to one or both configuration memories, thereby processing the data more efficiently. More specifically, a configuration dependent operational event signal 159 (FIG. 7) is generated by the PPE when a specified criteria is obtained. In response to the configuration dependent operational event signal 159, the VPM controller 30 obtains from the PPE the next configuration opcode 160 and acknowledges receipt of the next configuration opcode 159. The VPM controller 30 finds a set of configuration files in the library corresponding to the next configuration opcode, sequences the configuration files and prepares a operation sequence map for those files, and downloads the configuration files and operation sequence map to the configuration controller 32 and configuration memory 33.

Figure 13:
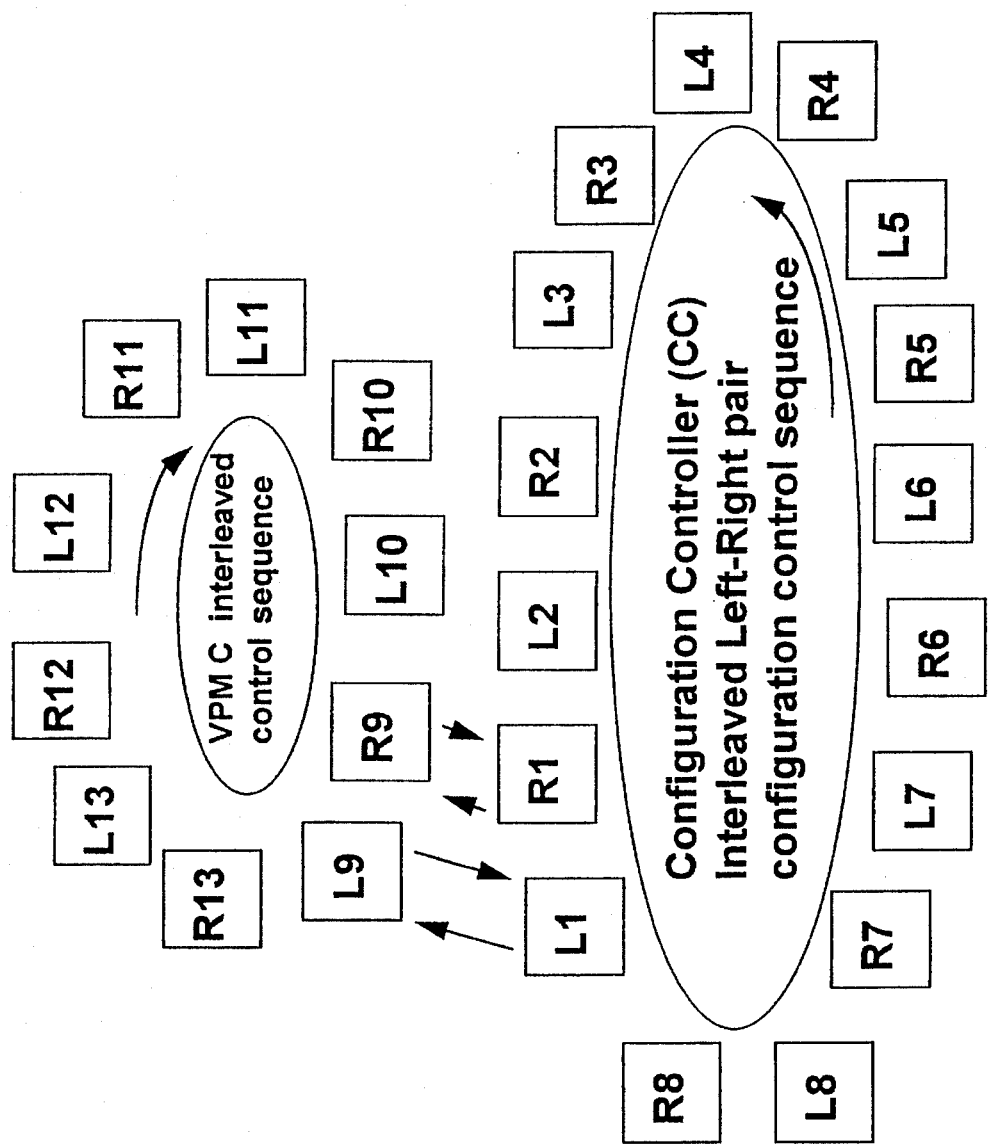
FIG. 13 is an illustration similar to that in FIG. 10 for an alternate left-right (shadow) execution sequence.

FIG. 13 illustrates the operation of a Shadow execution process. As can be seen from the diagram, configuration controller 32 controls the sequence of configuration files for both the left and right PPEs as one interleaved loop, because left and right PPEs are not active at the same time. Notice, that two configurations (one to the left and one to the right) are being transferred, simultaneously, by the VPM controller 30 for the memory extension to the configuration memories (L1 and R1 are being replaced by L9 and R9).

Figure 14:
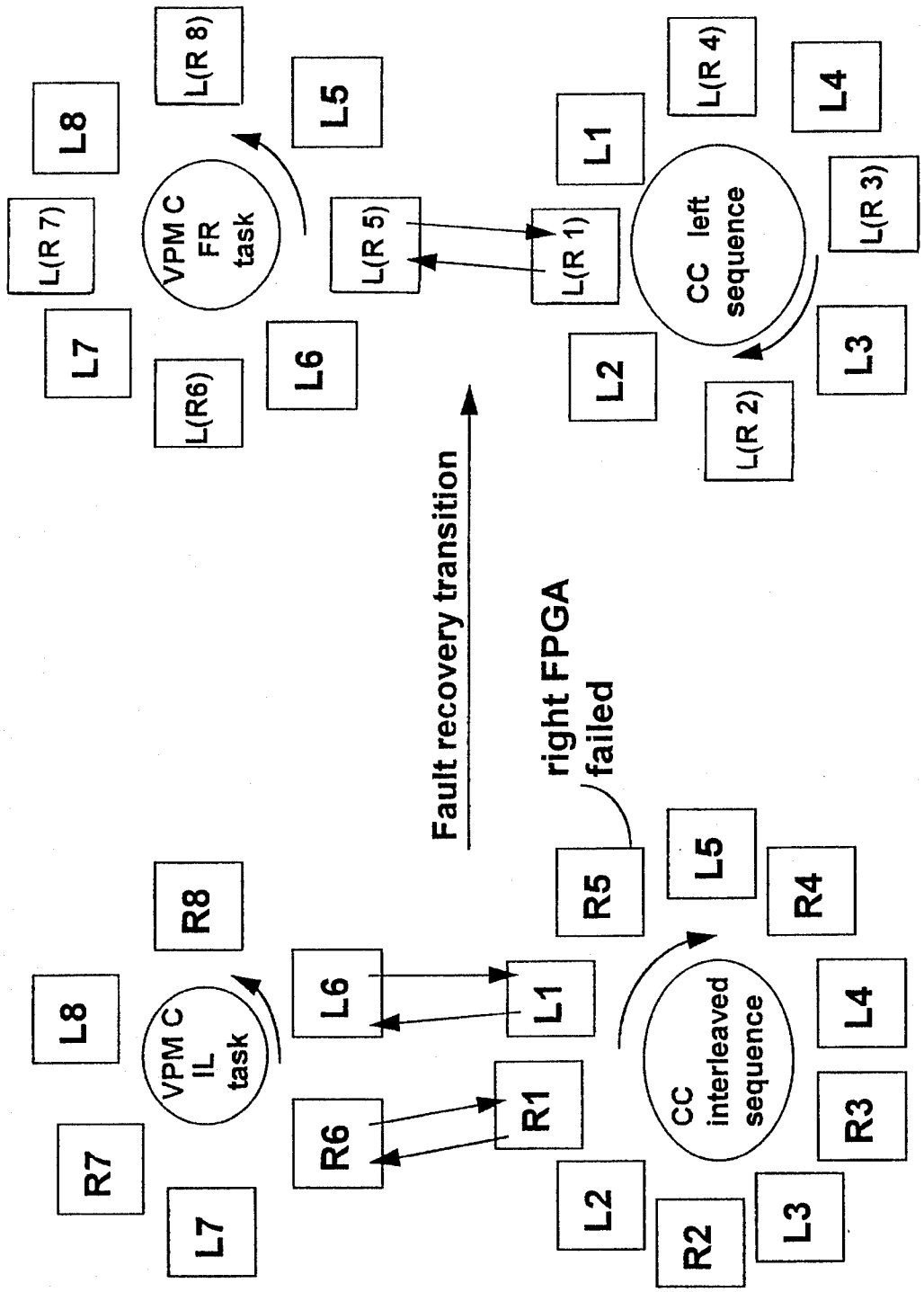
FIG. 14 is an illustration similar to that of FIG. 10 for a shadow execution process with the transition to fault recovery mode.

FIG. 14 illustrates a fault recovery transition from the Shadow execution process with an interleaved sequence before the detection of the fault, similar to the illustration in FIG. 13, to a left side only execution process after fault detection in the right side operation. For example, fault is detected in the right PPE pair (15,11) during execution of configuration R5. Upon fault detection, VPM controller 30 rebuilds the interleaved configuration sequence and operation sequence map from L1, R1, L2, R2, L3 . . . R7, L8, R8 to a corresponding sequence and map L1, L(R1), L2, L(R2), L3, L(R3) . . . L(R7), L8, L(R8) replacing all right configurations {R_} with left mirror configurations {L(R_)}, thereby executing the same functions with the left pair (1,7), instead of with the right pair (15,11). Mirror configuration files differ from normal ones, if at all, only in terms of PPE pinout. Then, VPM controller 30 continues the operation, however, with lower speed.

For convenience, specific features of the invention have been illustrated with respect to particular embodiments of the invention. However, any feature described herein can be combined with any, or all, of the other features.

The invention has been described in detail including the preferred embodiments thereof. However, it will be appreciated that other embodiments, including modifications and improvements of the present invention, will occur to those skilled in the art upon consideration of this specification and the drawings.

What is claimed is:

1. A Virtual Processor Module comprising the following components:

a reconfigurable, programmable logic matrix array for processing data in accord with a hardware encoded algorithm;

a memory for storing a plurality of hardware configuration files for the programmable logic matrix array, each configuration file for programming an algorithm to be executed by the matrix array;

an input/output bus under control of the matrix array for supplying data to the matrix array for processing and for obtaining processed data from the matrix array;

a memory device for storing data under control of the matrix array for storing and retrieving data during processing by the programmable matrix array without involvement of an external host;

a virtual processor module controller for controlling an overall operation of the virtual processor module including providing operation sequence maps, providing parameters for specific operations, providing status information, and receiving feedback signals from the matrix array;

a data bus controller under control of the matrix array for controlling a data flow to the matrix array for processing; and a configuration controller for controlling a sequence of reconfiguration of the matrix array to process data by a specific sequence of algorithms.

2. A virtual processor module as set forth in claim 1, wherein the reconfigurable, programmable logic matrix array comprises a plurality of programmable processing elements.

3. A virtual processor module as set forth in claim 2, wherein the programmable processing elements are field programmable gate arrays.

4. A virtual processor module as set forth in claim 1, wherein the reconfigurable, programmable logic matrix array comprises an even number of programmable processing elements.

5. A virtual processor module as set forth in claim 4, wherein the programmable processing elements are field programmable gate arrays.

6. A virtual processor module as set forth in claim 1, further comprising a second local memory device under control of the matrix array for storing operation parameters for ready access by the reconfigurable, programmable logic matrix array.

7. A virtual processor module as set forth in claim 1, further comprising a flexible connecting logic device having direct memory access control function and crossbar switch function for connecting components of the virtual processor in accord with an instruction or a request.

8. A virtual processor module comprising:

a programmable matrix array for processing data according to a hardware encoded algorithm;

a plurality of local memory devices under control of the matrix array connected to the programmable matrix array for storage of data processing parameters, processing results, control and status information;

a plurality of data memory devices under control of the matrix array for storing and retrieving data during processing by the programmable matrix array without involvement of an external host;

a plurality of data bus controller and switch devices, responsive to the programmable matrix array, for addressing data stored in the data memory devices and for directing said data to and from the programmable matrix array;

an I/O bus controller under control of the matrix array for connecting outside data buses to multiple points within programmable matrix array and for delivering data to and from external sources;

a plurality of configuration memories for storage of configuration files for configuring the programmable matrix array with hardware encoded algorithms;

a plurality of configuration controllers, one for controlling each said configuration memory according to an operation sequence map; and a virtual processor module controller for interaction with an external host, for sequencing configuration files to create an operation sequence map and loading the files into the configuration memories, for programming configuration controllers, for communicating with the programmable array matrix and delivering control information and parameters necessary for data processing from the local memory devices, and for reading results of the processing and status information;

wherein an execution of a complex operation can be achieved by dividing it into a series of simpler operations, each executable by a configuration file provided to the programmable matrix array through partial or complete reconfiguration, transparently to an user.

9. The virtual processor module of claim 8, in which the programmable matrix array includes a plurality of programmable processing elements.

10. The virtual processor module of claim 9, wherein the programmable processing elements are field programmable gate arrays.

11. The virtual processor module of claim 8, wherein the reconfigurable, programmable logic matrix array comprises an even number of programmable processing elements.

12. The virtual processor module of claim 11, wherein the programmable processing elements are field programmable gate arrays.

13. The virtual processor module of claim 8, further comprising a flexible connecting logic device having direct memory access control function and crossbar switch function for connecting components of the virtual processor in accord with an instruction or a request.

14. A method for processing data for a specific application, the method comprising:

providing a reconfigurable, programmable logic matrix array comprising two programmable processing elements controlled by a real time multitasking processor;

providing a plurality of configuration files, each file for configuring the logic matrix array to perform an algorithm for processing data;

sequencing a plurality of configuration files to perform a complex operation and for preparing an operation sequence map to control the configuration of the logic matrix array in said sequence;

providing a sequence operation map and a sequence of configuration files to configure each programmable processing element to process data in accord with the respective sequence maps;

configuring the two programmable processing elements with a first configuration for each programmable processing element and processing data with the two programmable processing elements in a synchronous mode wherein data is shared between the two programmable processing elements without involvement of an external host; and for each programmable processing element, after the data is processed by one configuration of the element, reconfiguring the element with a next configuration file in the sequence and continuing to process data until the operation sequence map is completed for both of the two elements.

15. The method for processing data in accord with claim 14, wherein the operation sequence map for each programmable processing element contains an equal number of configuration files, the first configuration for both elements is configured synchronously and data is processed in both elements synchronously, and each subsequent configuration for the two elements is configured in parallel and operated synchronously whether or not the processing in each element is completed at the same time.

16. The method for processing data in accord with claim 14, wherein the operation sequence map for each programmable processing element contains a different number of configuration files, one or more pairs of configuration files consisting of a configuration file from each operation sequence map is designated to be a locked pair, each of which is to be configured in its respective processing element at the same time so that data can be processed simultaneously by the elements in accord with designated locked configurations configured by the locked pair, each element being reconfigured in accord with the configuration files in its respective operation sequence map and processing data independently between the configuration files designated as a locked pair.

17. A method for processing data for a specific application, the method comprising:

providing a reconfigurable, programmable logic matrix array comprising two programmable processing elements controlled by a real time multitasking processor;

providing a plurality of configuration files, each file for configuring a programmable processing element to perform an algorithm for processing data;

sequencing a plurality of configuration files to perform a complex operation and for preparing an operation sequence map to control the configuration of each processing element in accord with said sequence;

providing a sequence operation map and a sequence of configuration files to alternately configure each programmable processing element to process data in accord with the sequence map;

configuring a first programmable processing element with a first configuration;

configuring the second programmable processing element with a second configuration while processing data with the first processing element;

alternately, configuring the first programmable processing element with a next configuration while processing data with the second programmable processing element and, then, configuring the second programmable processing element with another configuration while processing data with the first programmable processing element until the operation sequence map is completed for the two processing elements;

wherein data is shared between the two programmable processing elements without involvement of an external host.

18. The method for processing data in accord with claim 17, wherein the method further comprises:

detecting a fault in the processing of one of the processing elements;

reconstructing the sequence of configuration files to operate on the other processing element and reconstructing the sequence operation map accordingly; and continuing to alternately reconfigure the other processing element and then process data with that processing element until the operation sequence map is completed on that processing element.

19. A method for processing data for a specific application, the method comprising:

providing a reconfigurable, programmable logic matrix array controlled by a microprocessor;

providing a library of configuration files, each file for configuring the logic matrix array to perform an algorithm for processing data;

sequencing a first plurality of configuration files to perform a complex operation and for preparing an operation sequence map to control the configuration of the logic matrix array in said sequence;

providing a operation sequence map to configure the logic matrix array to process data in accord with the sequence of configuration files specified by the operation sequence map;

configuring the logic matrix array with a first configuration file and processing data in accord with the algorithm provided by the first configuration file and, after the data is processed by one configuration file, reconfiguring the logic matrix array with a next configuration file in the operation sequence map and continuing to process data until a programmed criteria is satisfied, thereby generating a configuration dependent operational event signal;

obtaining a next configuration opcode from the logic matrix array in response to the configuration dependent operational event signal;

locating a second plurality of configuration files in the library which are identified by the next configuration opcode;

sequencing the second plurality of configuration files and preparing a second operation sequence map for the second plurality of configuration files;

configuring the logic matrix array with the second plurality of configuration files in accord with the second operation sequence map to continue processing data; and providing a plurality of data memory devices accessible by the programmable matrix array for storing and retrieving data during processing by the programmable matrix array without involvement of an external host.

20. The method in accord with claim 19, wherein the method further comprises operating a multitasking real-time kernel in the microprocessor.

* * * * *